(12) United States Patent
Nishida et al.

(10) Patent No.: US 6,922,345 B2
(45) Date of Patent: Jul. 26, 2005

(54) FLY-BACK CONVERTER WITH CONSTANT PULSE WIDTH AND VARIABLE DUTY CYCLE USING A CAPACITOR IN CONTROL CIRCUIT

(75) Inventors: Akio Nishida, Kyoto (JP); Hiroshi Takemura, Muko (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 10/152,286

(22) Filed: May 22, 2002

(65) Prior Publication Data

US 2002/0186572 A1 Dec. 12, 2002

(30) Foreign Application Priority Data

Jun. 7, 2001 (JP) ........................................ 2001-172789

(51) Int. Cl.[7] ............................................. H02M 3/335
(52) U.S. Cl. ............................... 363/21.16; 363/21.15; 363/21.18
(58) Field of Search .......................... 363/21.15, 21.16, 363/21.17, 21.18

(56) References Cited

U.S. PATENT DOCUMENTS 4,849,869 A * 7/1989 Tanuma et al. .......... 363/21.13
6,529,391 B2 * 3/2003 Yoshinaga et al. ....... 363/21.15

FOREIGN PATENT DOCUMENTS

| JP | 7-015958 | 1/1995 |
|----|----------|--------|
| JP | 2000-278945 | 10/2000 |
| JP | 2001-16849 | 1/2001 |

* cited by examiner

*Primary Examiner*—Shawn Riley
(74) *Attorney, Agent, or Firm*—Keating & Bennett, LLP

(57) ABSTRACT

A switching power supply includes a control circuit disposed between a feedback winding and a switching device. The control circuit includes an on-period control circuit that, in an operation under a non-low load condition, controls an on-period of the switching device such that the on-period decreases with decreasing load, a minimum on-period setting circuit that disables the on-period control circuit in an operation under a low load condition so that the on-period of the switching device does not become shorter than a predetermined minimum on-period, and an off-period control circuit that controls an off-period of the switching device in the operation under the low load condition such that the off-period increases with decreasing load. As a result, the output voltage is maintained at a constant value in accordance with a feedback signal.

19 Claims, 7 Drawing Sheets

(b)

FLY-BACK CONVERTER WITH CONSTANT PULSE WIDTH AND VARIABLE DUTY CYCLE USING A CAPACITOR IN CONTROL CIRCUIT

BACKGROUND OF THE INVENTION

1. Field of the Invention

The present invention relates to a switching power supply and an electronic apparatus including a switching power supply, and more particularly, to a switching power supply that operates with low loss even under a low load condition, and an electronic apparatus including a switching power supply.

2. Description of the Related Art

In switching power supplies such as an RCC switching power supply, the switching frequency changes depending upon whether a load is low or high. When the load is high, the on-period and the off-period are both increased, and thus the switching frequency decreases. On the other hand, when the load is low, the on-period and the off-period are both decreased, and thus, the switching frequency increases. Various types of loss occur in the switching power supply. One type of loss is a switching loss which occurs each time a switching device switches. Because the switching loss occurs each time the switching device switches, if the frequency increases with decreasing load, a large switching loss occurs. Thus, the switching loss is a major component of the loss of the switching power supply when the load is within a low range. When the load is very low, intermittent oscillation may occurs, which causes an increase in output ripple or noise that is generated.

Japanese Unexamined Patent Application Publication No. 2001-16849 discloses a technique for reducing the increase in the switching frequency during the operation under a low load condition, by reducing the switching rate during the operation under the low load condition. In this technique, a minimum on-period of a switching device is set, and, when the output voltage increases as the load decreases, a signal which controls the turning-on of the switching device is blocked so as to prevent the switching device from turning on, thereby preventing the on-period of the switching device from decreasing to less than the minimum on-period, whereby the switching rate during the operation under the low load condition is reduced to achieve a reduction in switching loss.

However, in the switching power supply disclosed in Japanese Unexamined Patent Application Publication No. 2001-16849, the signal which turns the switching device on is blocked to prevent the turning-on of the switching device only when the output voltage is greater than a set value, and thus, the off-period of the switching device and the switching frequency are not constant even under a static load condition. Therefore, the problems associated with the increase in the output ripple and noise are not adequately solved.

SUMMARY OF THE INVENTION

In order to overcome the above-described problems, preferred embodiments of the present invention provide a switching power supply having low switching loss without producing problems associated with intermittent oscillation or an increase in output ripple during operation under a low load condition, and an electronic apparatus including such a novel switching power supply.

According to a preferred embodiment of the present invention, a switching power supply includes a transformer having a primary winding, a secondary winding and a feedback winding, a switching device connected in series to the primary winding, a control circuit connected between the feedback winding and a control terminal of the switching device, a rectifying and smoothing circuit connected to the secondary winding to rectify and smooth a voltage generated in the secondary winding and outputting a resultant rectified and smoothed voltage, and an output voltage detecting circuit to detect the voltage output from the rectifying and smoothing circuit and output a feedback signal to the control circuit, wherein the control circuit controls the output voltage at a constant value in accordance with the feedback signal by, in an operation under a non-low load condition, controlling the on-period within a range that is greater than a desired minimum on-period, while, in an operation under a low load condition, setting the on-period to the minimum on-period and controlling the off-period.

According to another preferred embodiment of the present invention, a switching power supply includes a transformer having a primary winding, a secondary winding and a feedback winding, a switching device connected in series to the primary winding, a control circuit connected between the feedback winding and a control terminal of the switching device, a rectifying and smoothing circuit connected to the secondary winding to rectify and smooth a voltage generated in the secondary winding and outputting a resultant rectified and smoothed voltage, and an output voltage detecting circuit to detect the voltage output from the rectifying and smoothing circuit and output a feedback signal to the control circuit, wherein the control circuit includes an on-period control circuit that controls an on-period of the switching device during an operation under a non-low load condition such that the on-period decreases with decreasing load, a minimum on-period setting circuit that disables the on-period control circuit from turning on the switching device during an operation under a low load condition such that the on-period of the switching device does not become shorter than a desired minimum on-period, and an off-period control circuit that controls an off-period of the switching device during the operation under the low load condition such that, when the operation of the on-period control circuit is disabled by the minimum on-period setting circuit, the off-period increases with decreasing load, whereby the output voltage is controlled at a constant value in accordance with the feedback signal.

The switching power supply according to preferred embodiments of the present invention operates in a current-critical mode during the operation under the non-low load condition.

In the switching power supply according to preferred embodiments of the present invention, the on-period control circuit includes a first capacitor that is charged or discharged during the on-period of the switching device, and the timing of turning-off of the switching device is determined by a time at which the voltage across the first capacitor reaches or crosses a voltage determined by the feedback signal, the minimum on-period setting circuit includes a second capacitor that is charged or discharged during the on-period of the switching device, the turning-off of the switching device by the on-period control circuit is disabled until the voltage across the second capacitor reaches or crosses a reference voltage, and the off-period control circuit includes a third capacitor that is charged or discharged during the off-period of the switching device, and the timing of turning-on of the switching device is determined by a time at which the voltage across the third capacitor reaches or crosses a voltage determined by the feedback signal.

In the switching power supply according to preferred embodiments of the present invention, the first capacitor also functions as the third capacitor, or as the second and third capacitors.

In the switching power supply according to preferred embodiments of the present invention, when the on-period control circuit is operating, the timing of turning-off of the switching device is determined at a time at which the voltage across the first capacitor reaches or crosses, in one direction, the voltage determined by the feedback signal, and when the operation of the on-period control circuit is disabled by the minimum on-period setting circuit, the timing of turning-on of the switching device is determined at a time at which the voltage across the first capacitor reaches or crosses, in a reverse direction, the voltage determined by the feedback signal.

In the switching power supply according to preferred embodiments of the present invention, the minimum on-period setting circuit is a device that is included in the on-period control circuit and disables the on-period control circuit from turning off the switching device for a fixed period after the switching device turns on, during the operation under low load condition.

In the switching power supply according to preferred embodiments of the present invention, the minimum on-period setting circuit discharges the first capacitor when the switching device turns on, and the minimum on-period setting circuit disables the switching device from turning off thereafter until the voltage of the first capacitor is charged thereafter until it reaches or crosses a predetermined voltage.

According to another preferred embodiment of the present invention, an electronic apparatus including the switching power supply according to preferred embodiments described above is provided.

In the switching power supply according to preferred embodiments of the present invention, as described above, the switching loss during operation under a low load condition is greatly reduced. Furthermore, intermittent oscillation is prevented and ripples are greatly reduced.

In the electronic apparatus according to the present invention, the efficiency in the standby state is greatly improved.

Other features, elements, characteristics and advantages of the present invention will become more apparent from the following detailed description of preferred embodiments with reference to the drawings thereof.

DETAILED DESCRIPTION OF PREFERRED EMBODIMENTS

Figure 1:
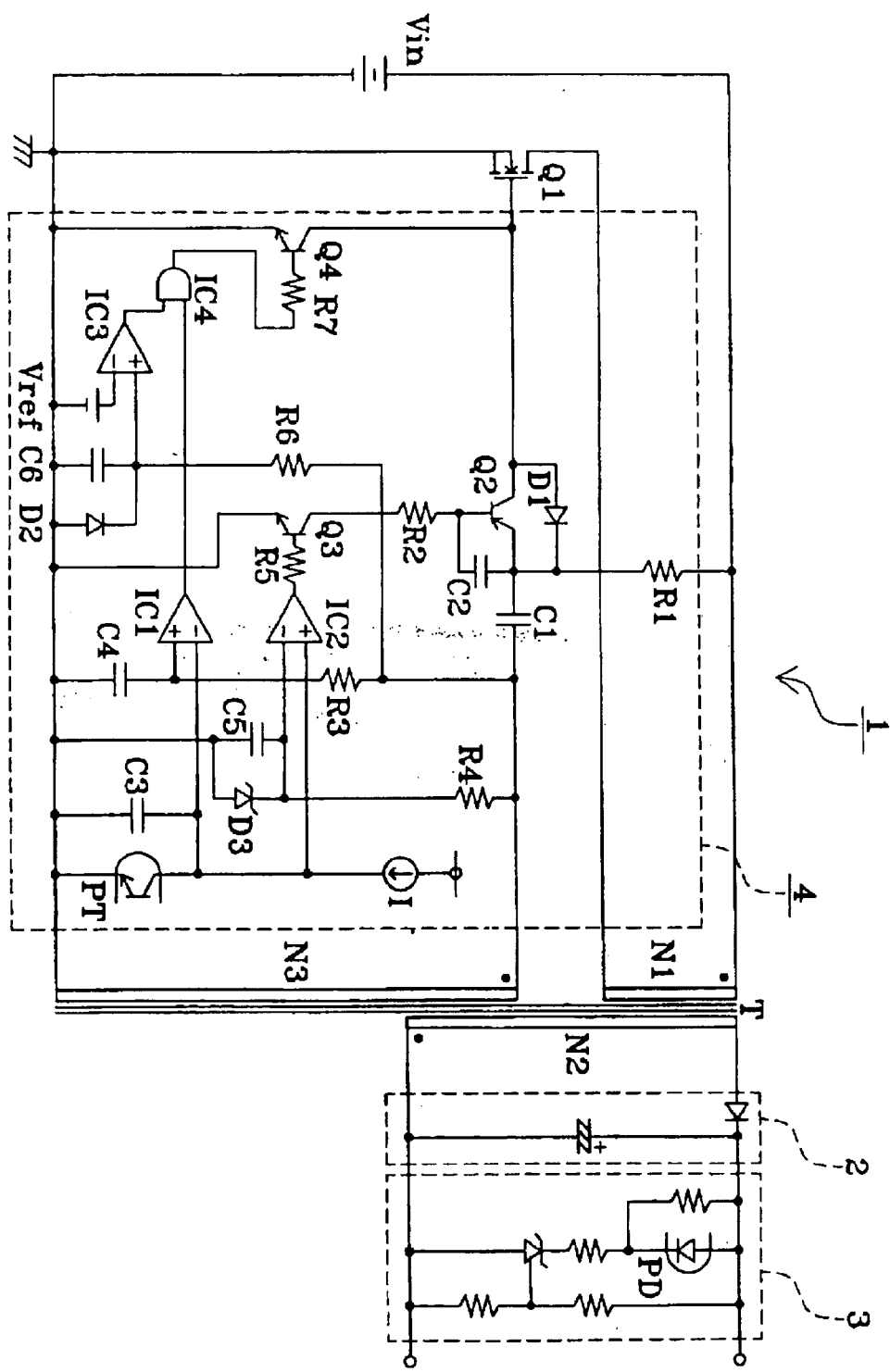
FIG. 1 is a circuit diagram of a switching power supply according to a preferred embodiment of the present invention.

FIG. 1 is a circuit diagram of a switching power supply according to a preferred embodiment of the present invention. As shown in FIG. 1, the switching power supply 1 includes a transformer T including a primary winding N1, a secondary winding N2, and a feedback winding N3, a DC power supply Vin and a MOSFET functioning as a switching device Q1, both connected in series to the primary winding N1, a rectifying and smoothing circuit 2 connected to the secondary winding N2, an output voltage detecting circuit 3 connected to the rectifying and smoothing circuit 2, and a control circuit 4 provided between the feedback winding N3 and a gate serving as a control terminal of the switching device Q1. The output voltage detecting circuit 3 includes a light emitting diode PD defining one element of a photocoupler for outputting a feedback signal to the control circuit 4, wherein the photocoupler is connected such that when the output voltage increases due to a reduction in load, the intensity of emitted light increases.

The control circuit 4 is described below. One end of the feedback winding N3 is connected to the gate of the switching device Q1 via a capacitor C1 and a path between the emitter and the collector of a transistor Q2, and the other end of the feedback winding N3 is connected to the source of the switching device Q1 and thus connected to ground. A diode D1 is connected between the emitter and collector of the transistor Q2, and a capacitor C2 is connected between the emitter and the base of the transistor Q2. Furthermore, the emitter of the transistor Q2 is connected to the DC power supply Vin via a starting resistor R1, and the base thereof is grounded via a resistor R2 and a path between the collector and the emitter of a transistor Q3.

A phototransistor PT coupled with the light emitting diode PD in the output voltage detecting circuit 3 is arranged such that the collector is connected to a constant current source I, the emitter is connected to ground, a capacitor C3 is connected between the collector and emitter, and the collector is connected to an inverting input terminal of a comparator IC1 and also to a non-inverting input terminal of a comparator IC2. The constant current source I is produced using the DC power supply Vin or a power supply obtained by rectifying and smoothing a voltage of the feedback winding N3.

One end of the feedback winding N3 is connected to ground via a resistor R3 and a capacitor C4 defining the first capacitor, wherein the node between the resistor R3 and the capacitor C4 is connected to the non-inverting input terminal of the comparator IC1. The output of the comparator IC1 is connected to one input of an AND circuit IC4. The one end of the feedback winding N3 is also connected to ground via a resistor R4 and to a parallel circuit of a Zener diode D3 and a capacitor C5 functioning as the third capacitor, wherein the node between the resistor R4 and the capacitor C5 is connected to the inverting input terminal of the comparator IC2. The output of the comparator IC2 is connected to the base of the transistor Q3 via a resistor R5.

Furthermore, the one end of the feedback winding N3 is also connected to ground via a resistor R6 and a parallel circuit of a diode D2 and a capacitor C6 functioning as the second capacitor, wherein the node between the resistor R6 and the capacitor C6 is connected to the non-inverting terminal of a comparator IC3. The inverting input terminal of the comparator IC3 is connected to a reference voltage source Vref, and the output of the comparator IC3 is connected to the other input of the AND circuit IC4. The output of the AND circuit 14 is connected to the base of a transistor Q4 via a resistor R7. The gate of the switching device Q1 is connected to ground via a path between the collector and the emitter of the transistor Q4.

Figure 2A:
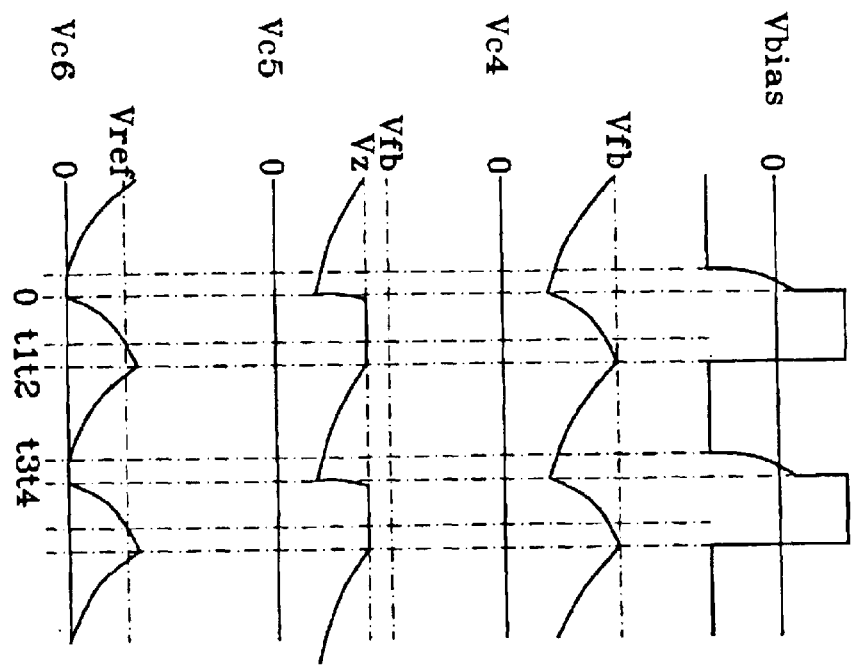
FIG. 2A is a diagram showing temporal changes, under a rated load condition, in Vbias, Vc4, Vc5, and Vc6 in the switching power supply shown in FIG. 1.
Figure 2B:
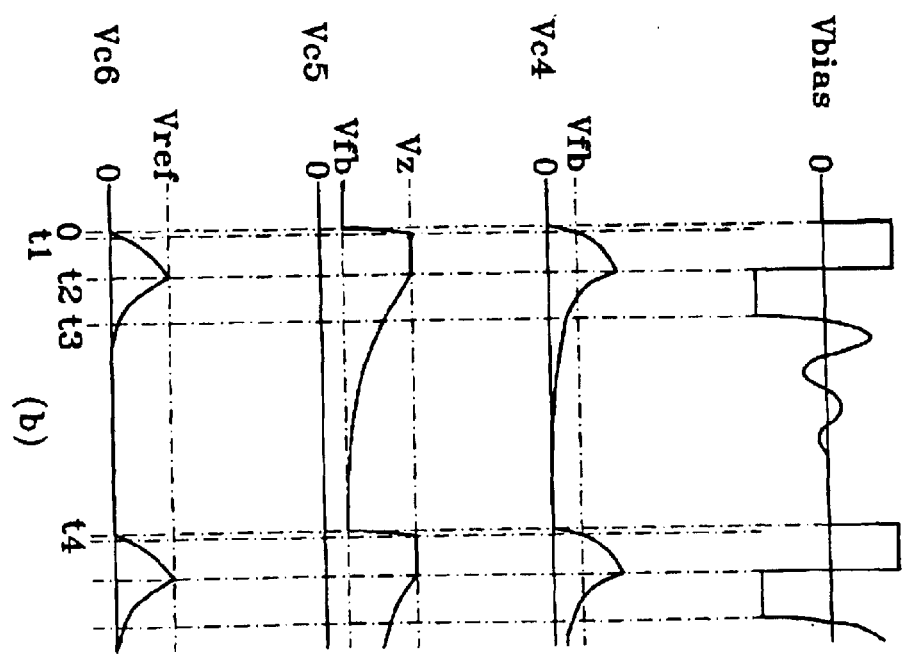
FIG. 2B is a diagram showing similar temporal changes under a low load condition.

The operation of the switching power supply 1 is described below with reference to FIG. 2. FIG. 2 shows changes, with time, in the voltage Vbias of the feedback winding N3, the voltage Vc4 across the capacitor C4 defining the first capacitor, the voltage Vc5 across the capacitor C5 serving as the third capacitor, and the voltage Vc6 across the capacitor C6 defining the second capacitor, for (a) operation under the rated load condition, and (b) operation under the low load condition. In FIG. 2, Vfb denotes the collector voltage of the phototransistor PT, which is input, as a feedback voltage, to the inverting input terminal of the comparator IC1. Vfb changes with load. However, when the output voltage does not change, Vfb is maintained at a substantially constant value. Herein, a circuit defined by the constant current source I, the phototransistor PT, and the capacitor C3 is referred to as a feedback voltage generator. Vz denotes a cathode voltage of the Zener diode D3 in a breakdown state, which is applied to the inverting input terminal of the comparator IC2. Vref denotes the voltage of the reference voltage source Vref, which is connected to the inverting input terminal of the comparator IC3.

The operation under the rated-load condition, which is a particular type of non-low load condition, is described below for various operation stages. Herein, the low load condition refers to a condition where the load is lower than a predetermined value, and the non-low load condition refers to a state where the load is higher than the predetermined value, wherein the operation with the rated load occurs under the non-low load condition.

(t=0 to t1)

When the switching device Q1 turns on, a current flows through the primary winding N1, and the voltage Vbias of the feedback winding N3 becomes positive. As a result, charging of the capacitors C4, C5, and C6 begins. The charging of the capacitor C5 stops when the voltage Vc5 across the capacitor C5 reaches Vz, and no further changing occurs. Under the rated load condition, Vfb has a higher level than Vz, and thus, the output of the comparator IC2 is at an H-level (high level). When the output of the comparator IC2 is at the H-level, the transistor Q3 is in an on-state, and thus, the transistor Q2 is also in the on-state.

(t=t1 to t2)

When the voltage Vc6 across the capacitor C6 becomes greater than Vref, the output of the comparator IC3 goes to the H-level. However, at this point of time, the voltage Vc4 across the capacitor C4 has not yet exceeded Vfb, and thus the output of the comparator IC1 remains at an L-level (low level) and the output of the AND circuit IC4 also remains at the L-level.

(t=t2 to t3)

When the voltage Vc4 across the capacitor C4 becomes greater than Vfb, the output of the comparator IC1 goes to the H-level. As a result, the two inputs of the AND circuit IC4 both become high and the output thereof also becomes also high. This transition to the H-level turns the transistor Q4 on via the resistor R7. The turning on of the transistor Q4 causes the switching device Q1 to turn off. Thus, the on-period of the switching device Q1 ends. That is, the crossing of Vfb determined by the feedback signal, in the increase in the voltage Vc4 across the capacitor C4 function the first capacitor, functions as a trigger that determines the timing of the turning-off of the switching device Q1, and thus, determines the on-period of the switching device Q1.

Because the resistance between the collector and the emitter of the phototransistor PT decreases as the load reduces and thus, as the intensity of light received from the light emitting diode PD increases, Vfb decreases as the load decreases. Therefore, the time required for the voltage Vc4 across the capacitor C4 to exceed Vfb decreases as the load decreases. Thus, a circuit including the resistor R3, the capacitor C4, the comparator IC1, the AND circuit IC4, the resistor R7, the transistor Q4, and the feedback voltage generator defines an on-period control circuit that controls the on-period of the switching device Q1 such that the on-period decreases as the load decreases in operation under the non-low load condition.

When the switching device Q1 turns off, a current begins to flow from the secondary winding N2 into the rectifying and smoothing circuit 2, and the voltage Vbias of the feedback winding N3 becomes negative. As a result, discharging of the capacitors C4, C5, and C6 begins. If the discharge of the capacitor C4 begins, the voltage Vc4 across the capacitor C4 immediately decreases to less than Vfb, and thus, the output of the comparator IC1 goes to the L-level and the output of the AND circuit IC4 goes to the L-level. As a result, the transistor Q4 returns to the off-state. That is, in the above-described process, the transistor Q4 turns on only temporarily in order to turn off the switching device Q1.

As understood from the above description, because the voltage Vc4 across the capacitor C4 very quickly returns to a level lower than Vfb after becoming higher than Vfb, the turning-off of the switching device Q1 occurs when the voltage Vc4 reaches Vfb without exceeding it.

(t=t3 to t4)

When the switching device Q1 is in the off-state, if the current flowing out of the secondary winding N2 into the rectifying and smoothing circuit 2 becomes zero, the voltage Vbias of the feedback winding N3 starts to resonate.

(t≧t4)

The first positive portion of a resonating wave of the voltage Vbias is applied to the gate of the switching device Q1 via the transistor Q2 in the on-state, and thus, the switching device Q1 turns on. That is, the transition-to-zero of the current from the secondary winding N2 to the rectifying and smoothing circuit 2 serves as a trigger that turns on the switching device Q1. If the switching device Q1 turns on, the resonance of the voltage Vbias stops, and the voltage Vbias again becomes positive as at t=0. Thereafter, the process after t=0 is repeated.

In the operation under the rated load condition (under non-low load condition), as described above, when the current flowing through the primary winding N1 stops, a current immediately begins to flow from the secondary winding N2 to the rectifying and smoothing circuit 2, and, if the current flowing out of the secondary winding N2 stops, the switching device Q1 immediately turns on and a current starts to flow through the primary winding N1. Such an operation mode is referred to as a current-critical mode. That is, under the rated load condition, the switching power supply 1 operates in the current-critical mode.

When the on-period of the switching device Q1 is controlled in the operation under the non-low load condition, magnetic energy stored in the transformer T changes in response to a change in the on-period resulting from a change in the load, and thus, a corresponding change occurs in the off-period during which the magnetic energy is released.

The operation under the low load condition is now described below for various operation stages.

(t=0 to t1)

When the switching device Q1 turns on, a current flows through the primary winding N1, and the voltage Vbias of the feedback winding N3 becomes positive. As a result, charging of the capacitors C4, C5, and C6 begins. When the switching device Q1 turns on, as will be described later, the capacitor C6 is in a completely discharged state, and thus, the voltage Vc6 across the capacitor C6 is equal to 0 V. The charging of the capacitor C5 stops when the voltage Vc5 across the capacitor C5 has reached Vz, and no further changing occurs. Under the low load condition, Vfb is less than Vz, and thus, the output of the comparator IC2 is at the L-level. When the output of the comparator IC2 is at the L-level, the transistor Q3 is in the off-state, and thus, the transistor Q2 is also in the off-state.

(t=t1 to t2)

When the voltage Vc4 across the capacitor C4 becomes greater than Vfb, the output of the comparator IC1 goes to the H-level, and the on-period control circuit attempts to begin operating. However, at this point of time, the voltage Vc6 across the capacitor C6 has not yet reached Vref, and thus, the output of the comparator IC3 still remains at the L-level and the output of the AND circuit IC4 also remains at the L level. That is, crossing the voltage Vfb during the increase in the voltage Vc4 of the capacitor C4 defining the first capacitor does not function as a trigger that causes the switching device Q1 to turn off, and the operation of the on-period control circuit is disabled.

(t=t2 to t3)

When the voltage Vc6 across the capacitor C6 becomes greater than Vref, the output of the comparator IC3 goes to the H-level. As a result, the levels of the two inputs of the AND circuit IC4 both become high and the output of the AND circuit IC4 also becomes high, which causes the transistor Q4 to turn on. The turning-on of the transistor Q4 causes the switching device Q1 to turn off. Thus, the on-period of the switching device Q1 terminates. That is, crossing the voltage Vref in the increase in the voltage Vc6 of the capacitor C6 defining the second capacitor functions as a trigger that determines the timing of turning off the switching device Q1, and thus, determines the on-period. In other words, the minimum on-period of the switching device Q1 is determined by a period required for the voltage Vc6 across the capacitor C6 to exceed Vref after increasing from 0 V. Thus, a circuit including the resistor R6, the capacitor C6, the diode D2, the reference voltage source Vref, and the comparator IC3 defines a minimum on-period setting circuit that suppresses the turning-off operation of the switching device Q1.

When the switching device Q1 turns off, a current starts to flow from the secondary winding N2 into the rectifying and smoothing circuit 2, and the voltage Vbias of the feedback winding N3 becomes negative. As a result, discharging of the capacitors C4, C5, and C6 begins. If the discharging of the capacitor C6 begins, the voltage Vc6 across the capacitor C6 immediately becomes less than Vref, and thus, the output of the comparator IC3 goes to the L-level and the output of the AND circuit IC4 goes to the L-level. As a result, the transistor Q4 returns to the off-state. That is, in the above-described process, the transistor Q4 turns on only temporarily in order to turn off the switching device Q1. The diode D2 prevents the capacitor C6 from being charged in an opposite direction.

(t=t3 to t4)

When the switching device Q1 is in the off-state, if the current flowing out of the secondary winding N2 into the rectifying and smoothing circuit 2 becomes zero, the voltage Vbias of the feedback winding N3 starts to resonate. At this point of time, the transistor Q2 is in the off-state, and thus, the resonating voltage Vbias is not applied to the gate of the switching device Q1 and the resonating voltage Vbias attenuates with time. That is, the turning-on of the switching device Q1 by the resonating voltage Vbias is prevented. Thereafter, therefore, no current flows through the primary winding N1 and the secondary winding N2. As a result, the current-critical mode is aborted. On the other hand, the capacitor C5 is further discharged and the voltage Vc5 across the capacitor C5 further decreases. The capacitors C4 and C6 are also further discharged, and the voltages Vc4 and Vc6 approach 0 V with the passage of time.

(t≧t4)

If the voltage Vc5 across the capacitor C5 decreases until it becomes less than Vfb, the output of the comparator IC2 goes to the H-level. As a result, the transistor Q3 turns on, and thus, the transistor Q2 turns on. This causes the charge, which has been stored in the capacitor C1 by t=t4, to be applied to the gate of the switching device Q1 via the transistor Q2. As a result, the switching device Q1 turns on. Thus, crossing the voltage Vfb during the change in the voltage Vc5 across the capacitor C5 defining the third capacitor functions as a trigger that determines the timing of the turning-on of the switching device Q1. Because Vfb decreases with decreasing load, the time required for the voltage Vc5 across the capacitor C5 to decrease until it becomes less than Vfb increases with decreasing load. Thus, a circuit including the resistor R4, the capacitor C5, the Zener diode D3, the comparator IC2, the resistor R5, the transistor Q3, the resistor R2, the capacitor C2, and the feedback voltage generator defines an off-period control circuit that controls the off-period of the switching device Q1 in the operation under low load condition such that the off-period increases with decreasing load. Note that the capacitance of the capacitor C6 and the resistance of the resistor R6 are set such that the capacitor C6 is completely discharged by the above-described point of time. Thereafter, the process after t=0 is repeated.

In the switching power supply 1, as described above with reference to FIGS. 1 and 2, the on-period control circuit controls the on-period of the switching device in the operation under the non-low load condition such that the output voltage is maintained at a constant value, while, in the operation under low load condition, the minimum on-period setting circuit sets the on-period of the switching device to the minimum on-period, and the off-period control circuit controls the off-period such that the output voltage is maintained at the constant value.

Thus, an increase in the switching frequency in the operation under the low load condition is suppressed and the switching frequency with decreasing load is reduced, thereby achieving a reduction in switching loss in the operation under the low load condition. Furthermore, because the off-period of the switching device is controlled continuously depending on the load in the low-load operation, intermittent oscillation is prevented, and thus, output ripples are greatly decreased. Furthermore, because the duty ratio of the switching operation of the switching device is continuous at the boundary between the low load mode and the non-low load mode, the switching operation is prevented from becoming discontinuous when the load is close to the above-described boundary.

Figure 3:
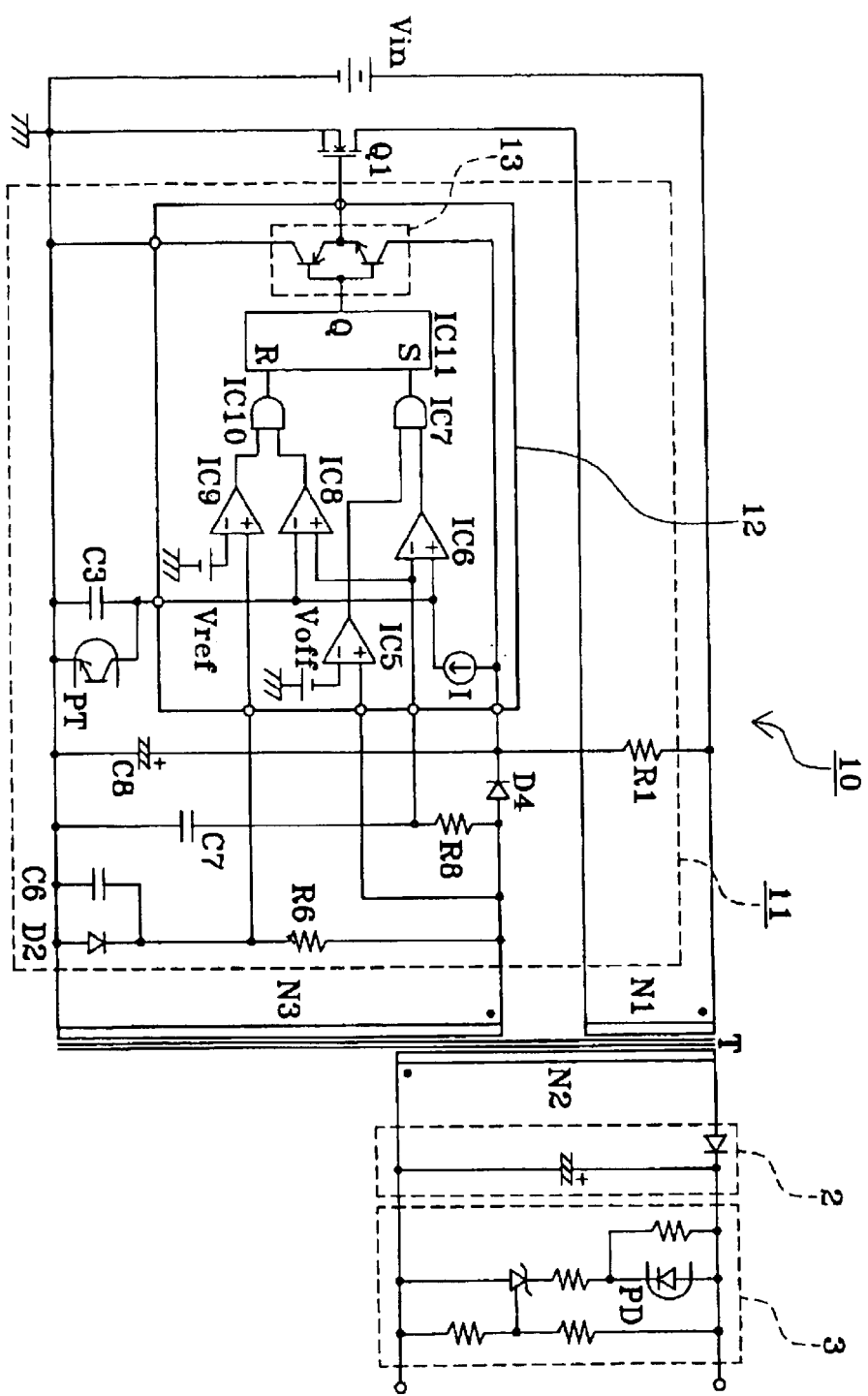
FIG. 3 is a circuit diagram of a switching power supply according to another preferred embodiment of the present invention.

FIG. 3 is a circuit diagram of a switching power supply according to another preferred embodiment of the present invention. In FIG. 3, similar components to those in FIG. 1 are denoted by similar reference numerals, and the description thereof is omitted.

As shown in FIG. 3, the switching power supply 10 includes a control circuit 11 provided between the feedback winding N3 and the gate of a switching device Q1, wherein a main portion of the control circuit 11 is defined by an integrated circuit 12. The control circuit 11 including constituent elements of the integrated circuit 12 is described below.

One end of the feedback winding N3 is connected to the integrated circuit 12 via a rectifying and smoothing circuit including a diode D4 and a capacitor C8. The voltage output from the rectifying and smoothing circuit is applied to each element of the integrated circuit 12. The node between the diode D4 and the capacitor C8 is connected to a DC power supply Vin via a starting resistor R1.

A phototransistor PT coupled with the light emitting diode PD in the output voltage detecting circuit 3 is arranged such that the collector is connected to a constant current source I, the emitter is connected to ground, a capacitor C3 is connected between the collector and emitter, and the collector is connected to a non-inverting input terminal of a comparator IC6 and also to an inverting input terminal of a comparator IC8. The constant current source I is provided using the voltage supplied to the integrated circuit 12 from the rectifying and smoothing circuit including the diode D4 and the capacitor C8.

The one end of the feedback winding N3 is connected to a non-inverting input terminal of a comparator IC5. An inverting input terminal of the comparator IC5 is connected to an offset voltage source Voff having a small negative voltage such that the output of the comparator IC5 becomes high when the voltage of the non-inverting input terminal is equal to zero.

The one end of the feedback winding N3 is also connected to ground via a resistor R8 and a capacitor C7, and the node between the resistor R8 and the capacitor C7 is connected to the inverting input terminal of the comparator IC6 and also to the non-inverting input terminal of the comparator IC8. The capacitor C7 defines the first and third capacitors.

The one end of the feedback winding N3 is also connected to ground via a resistor R6 and a parallel circuit of a diode D2 and a capacitor C6 defines the second capacitor. The node between the resistor R6 and the capacitor C6 is connected to a non-inverting input terminal of a comparator IC9. An inverting input terminal of the comparator IC9 is connected to a reference voltage source Vref, and the output of the comparator IC9 is connected to one input of an AND circuit IC10.

The outputs of the comparators IC5 and IC6 are connected to two inputs of an AND circuit IC7, and the output of the AND circuit IC7 is connected to a set terminal S of an RS flip-flop IC11. Similarly, the outputs of the comparators IC8 and IC9 are connected to two inputs of an AND circuit IC10, and the output of the AND circuit IC10 is connected to a reset terminal R of an RS flip-flop IC11. The output terminal Q of the RS flip-flop IC11 is connected to the gate of the switching device Q1 via the drive circuit 13. The inverting output terminal of the RS flip-flop IC11 is not used, and thus it is not shown in the figure. The drive circuit 13 uses, as a power supply voltage, the voltage supplied to the integrated circuit 12.

Of the above-described elements, the current source I, the comparators, IC5, IC6, IC8, and IC9, the AND circuits IC7 and IC10, the RS flip-flop IC11, the drive circuit 13, the offset voltage source Voff, and the reference voltage source Vref define the integrated circuit 12.

Figure 4A:
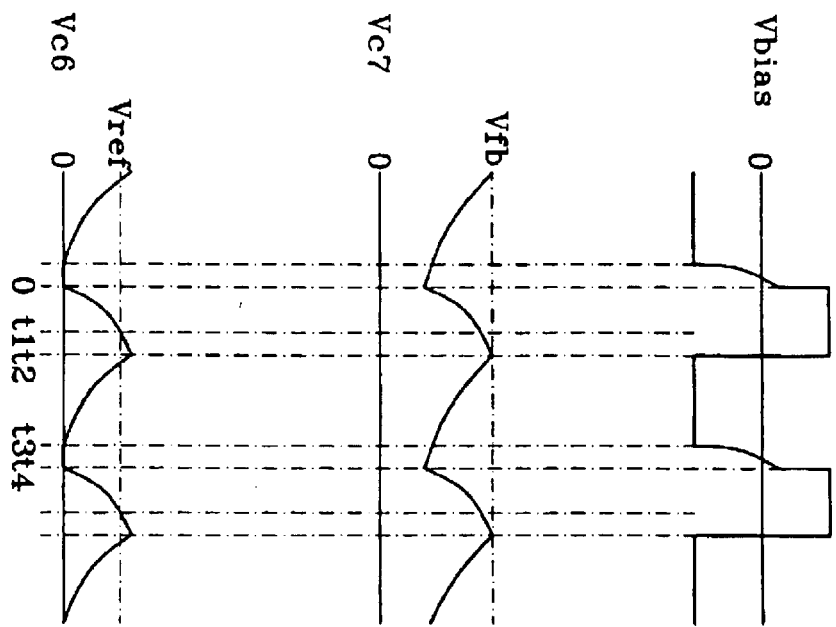
FIG. 4A is a diagram showing temporal changes, under the rated load condition, in Vbias, Vc6, and Vc7 in the switching power supply shown in FIG. 3.
Figure 4B:
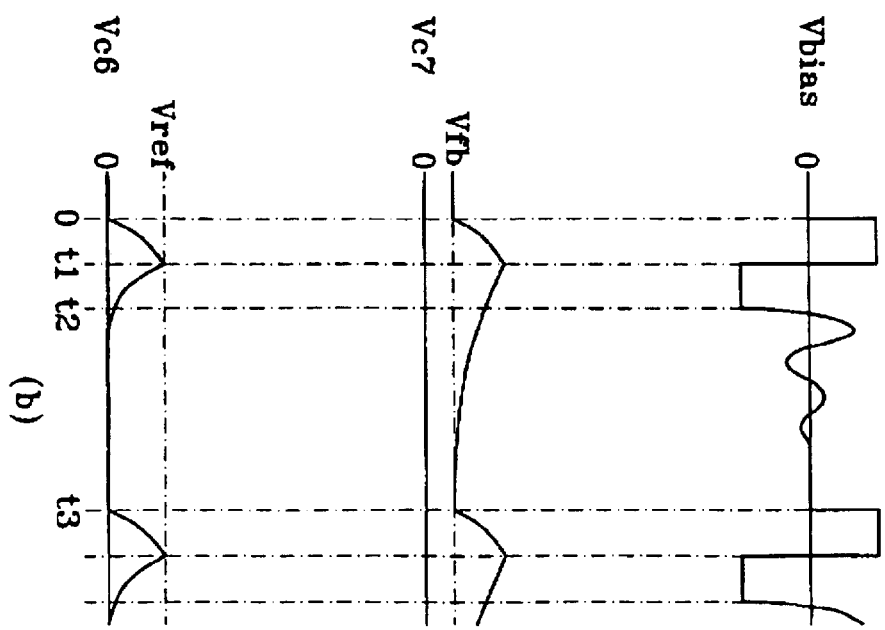
FIG. 4B is a diagram showing similar temporal changes under the low load condition.

The operation of the switching power supply 10 is described below with reference to FIG. 4. FIG. 4 shows changes, with time, in the voltage Vbias of the feedback winding N3, the voltage Vc7 across the capacitor C7 defining the first capacitor and also as the third capacitor, and the voltage Vc5 across the second capacitor C6, under (a) the rated load condition, and (b) light load condition of the switching power supply 10. In FIG. 4, Vfb denotes the collector voltage of the phototransistor PT, which is applied as a feedback voltage to the non-inverting input terminal of the comparator IC6 and also to the inverting input terminal of the comparator IC8. Vfb changes with load. However, when the output voltage does not change, Vfb is maintained at a substantially constant value. Vref denotes the voltage of the reference voltage source Vref, which is connected to the inverting input terminal of the comparator IC9.

The operation under the non-low load condition is described below for various operation stages.

(t=0 to t1)

When the switching device Q1 turns on, a current flows through the primary winding N1, and the voltage Vbias of the feedback winding N3 becomes positive. As a result, charging of the capacitors C6 and C7 begins. In the operation under the rated load condition, Vfb is at a high level, and thus, the voltage Vc7 across the capacitor C7 is less than Vfb. As a result, the output of the comparator IC6 is at the H-level and the output of the comparator IC8 is at the L-level. Furthermore, the output of the comparator IC5 is at the H-level because the voltage Vbias is applied to the non-inverting input terminal thereof.

(t=t1 to t2)

If the voltage Vc6 across the capacitor C6 increases and exceeds Vref, the output of the comparator IC9 goes to the H-level. However, at this point of time, the voltage Vc7 across the capacitor C7 does not yet exceed Vfb, and thus, the output of the comparator IC8 still remains at the L-level and the output of the AND circuit IC10 also remains at the L-level. Herein, the output of the comparator IC6 is at the H-level because the inputs thereof are connected in a manner that is opposite to the comparator IC8.

(t=t2 to t3)

If the voltage Vc7 across the capacitor C7 exceeds Vfb, the output of the comparator IC8 goes to the H-level, and the two inputs of the AND circuit IC10 both become high. As a result, the output of the AND circuit IC10 goes to the H-level. Herein, the output level of the comparator IC6 becomes low, and thus, the output level of the AND circuit IC7 becomes low. When the output level of the AND circuit 10 becomes high, the rising edge of the output voltage serves as a trigger that resets the RS flip-flop IC11. If the RS flip-flop IC11 is reset, the output thereof goes to the L-level, which causes the switching device Q1 to be turned off via the drive circuit 13, and thus, the on-period terminates. That is, crossing the voltage Vfb determined by the feedback signal in the change in the voltage Vc7 across the capacitor C7 functioning as the first capacitor functions as a trigger that determines the timing of the turning-off of the switching device Q1 and thus, determines the on-period.

Because the resistance between the collector and the emitter of the phototransistor PT decreases as the load decreases and thus, as the intensity of light received from the light emitting diode PD increases, Vfb decreases with decreasing load. Therefore, the time needed for the voltage Vc7 across the capacitor C7 to exceed Vfb decreases as the load decreases. Thus, a circuit including the resistor R8, the capacitor C7, the comparator IC8, the AND circuit IC10, the RS flip-flop IC11, the drive circuit 13, and the feedback voltage generator functions as an on-period control circuit that controls the on-period of the switching device Q1 such that the on-period decreases with decreasing load in the non-light load state.

When the switching device Q1 turns off, a current starts to flow from the secondary winding N2 into the rectifying and smoothing circuit 2, and the voltage Vbias of the feedback winding N3 becomes negative. As a result, discharging of the capacitors C6 and C7 starts. If the discharging of the capacitor C7 starts, the voltage Vc7 across the capacitor C7 immediately becomes lower than Vfb, and thus, the output of the comparator IC8 goes to the L-level and the output of the AND circuit IC10 goes to the L-level. On the other hand, the output of the comparator IC6 goes to the H-level, and the negative voltage Vbias is applied to the non-inverting input terminal of the comparator IC5. As a result, the output of the comparator IC5 goes to the L-level, and the output of the AND circuit IC7 goes to the L-level. If further discharging of the capacitor C6 occurs, the voltage Vc6 across the capacitor C6 becomes lower than Vref, and the output level of the comparator IC9 becomes low.

As understood from the above description, because the voltage Vc7 across the capacitor C7 quickly returns to a level lower than Vfb after becoming higher than Vfb, the turning-off of the switching device Q1 occurs when the voltage Vc7 reaches Vfb without exceeding it.

(t=t3 to t4)

When the switching device Q1 is in the off-state, if the current flowing out of the secondary winding N2 into the rectifying and smoothing circuit 2 becomes zero, the voltage Vbias of the feedback winding N3 starts to resonate.

(t≧t4)

The first positive portion of a resonating wave of the voltage Vbias causes the voltage of the non-inverting input terminal of the comparator IC5 to become higher than the voltage of the inverting input terminal, and thus, the output level of the comparator IC5 becomes high. Because the output level of the comparator IC6 is already high, the output of the AND circuit IC7 goes to the H-level. The rising edge of this transition of the output voltage serves as a trigger that sets the RS flip-flop IC11. If the RS flip-flop IC11 is set, the output thereof goes to the H-level, which causes the switching device Q1 to be turned on via the drive circuit 13. That is, the transition of the current from the secondary winding N2 to the rectifying and smoothing circuit 2 to zero serves as a trigger that turns on the switching device Q1. If the switching device Q1 turns on, the resonance of the voltage Vbias stops, and the voltage Vbias again becomes positive as at t=0. Thereafter, the process after t=0 is repeated.

In the operation under the rated load condition (under the non-low load condition), as described above, when the current flowing through the primary winding N1 stops, a current immediately starts to flow from the secondary winding N2 to the rectifying and smoothing circuit 2, and, if the current flowing out of the secondary winding N2 stops, the switching device Q1 immediately turns on and a current starts to flow through the primary winding N1. Thus, under the rated load condition, the switching power supply 10 operates in the current-critical mode.

The operation under the low load condition is described below for various operation stages.

(t=0 to t1)

When the switching device Q1 turns on, a current flows through the primary winding N1, and the voltage Vbias of the feedback winding N3 becomes positive. As a result, charging of the capacitors C6 and C7 begins. At the point of time at which the switching device Q1 turns on, as will be described later, the capacitor C6 is in a completely discharged state, and thus, the voltage Vc6 across the capacitor C6 is equal to 0 V. As a result of the change of the voltage Vbias to a positive value, the output level of the comparator IC5 becomes high. In the light load state, because Vfb is low and the voltage Vc7 across the capacitor C7 is greater than Vfb, the output of the comparator IC6 is at the L-level and the output of the comparator IC8 is at the H-level. That is, the increase in the voltage Vc7 of the capacitor C7 defining the first capacitor does not function as a trigger that causes the switching device Q1 to turn off, and thus, the operation of the on-period control circuit is suppressed. Furthermore, because the voltage Vc6 across the capacitor C6 is less than Vref, the output of the comparator IC9 is at the L-level.

(t=t1 to t2)

When the voltage Vc6 across the capacitor C6 exceeds Vref, the output of the comparator IC9 goes to the H-level. Because the output level of the comparator IC8 is already high, the output of the AND circuit IC10 goes to the H-level. On the other hand, the voltage Vc7 across the capacitor C7 is greater than Vfb, and thus, the output of the comparator IC6 remains at the L-level, and the output of the AND circuit IC7 remains at the L-level. When the output level of the AND circuit 10 becomes high, the rising edge of the output voltage serves as a trigger that resets the RS flip-flop IC11. If the RS flip-flop IC11 is reset, the output thereof goes to the L-level, which causes the switching device Q1 to be turned off via the drive circuit 13. That is, in the increase in the voltage Vc6 across the capacitor C6 defining the second capacitor, crossing the voltage Vref serves as a trigger that determines the timing of the turning-off the switching device Q1 and thus, determines the on-period. In other words, the minimum on-period of the switching device Q1 is determined by a period required for the voltage Vc6 across the capacitor C6 to exceed Vref after starting to increase from 0 V. Thus, a circuit including the resistor R6, the capacitor C6, the diode D2, the comparator IC9, and the reference voltage source Vref serves as a minimum on-period setting circuit that disables the on-period control circuit from turning on the switching device in the operation under the low load condition.

When the switching device Q1 turns off, a current starts to flow from the secondary winding N2 into the rectifying and smoothing circuit 2, and the voltage Vbias of the feedback winding N3 becomes negative. As a result, discharging of the capacitors C6 and C7 starts. If the discharging of the capacitor C6 begins, the voltage Vc6 across the capacitor C6 immediately becomes less than Vref, and thus, the output of the comparator IC9 goes to the L-level and the output of the AND circuit IC10 also goes to the L-level.

(t=t2 to t3)

When the switching device Q1 is in the off-state, if the current flowing out of the secondary winding N2 into the rectifying and smoothing circuit 2 becomes zero, the voltage Vbias of the feedback winding N3 starts to resonate. The first positive portion of the resonating wave of the voltage Vbias causes the voltage of the non-inverting input terminal of the comparator IC5 to become greater than the voltage of the inverting input terminal, and thus, the output level of the comparator IC5 becomes high. However, at this point in time, the voltage Vc7 across the capacitor C7 is still greater than Vfb and the output of the comparator IC6 still remains at the L-level. Therefore, the output of the AND circuit IC7 remains at the L-level, and thus, the RS flip-flop IC11 is not set. That is, the turning-on of the switching device Q1 by the resonating voltage Vbias is prevented. Therefore, after that, no current flows through the primary winding N1 and the secondary winding N2. As a result, the current-critical mode is aborted. Thus, the resonating voltage Vbias attenuates with passage of time, and the output level of the comparator IC5 becomes alternately high and low. When the voltage Vbias has completely attenuated, the voltage of the non-inverting input terminal of the comparator IC5 becomes equal to zero. In this state, because the inverting input terminal of the comparator IC5 is connected to the offset voltage source Voff having a small negative value, the output level of the comparator IC5 becomes high. On the other hand, the capacitor C7 is further discharged, and the voltage Vc7 across the capacitor C7 further decreases. The capacitor C6 is also further discharged, and the voltage Vc6 across the capacitor C6 decreases with time toward 0 V.

(t≧t3)

If the voltage Vc7 across the capacitor C7 decreases to becomes less than Vfb, the output of the comparator IC6 goes to the H-level, and the output of the comparator IC8 goes to the L-level. Because the output level of the comparator IC5 is already high, the output of the AND circuit IC7 goes to the H-level. The rising edge of this transition of the output voltage serves as a trigger that sets the RS flip-flop IC11. If the RS flip-flop IC11 is set, the output thereof goes to the H-level, which causes the switching device Q1 to be turned on via the drive circuit 13. Thus, the crossing of the voltage Vc7 of the capacitor C7 also defining the third capacitor across Vfb serves as a trigger that determines the timing of the turning-on of the switching device Q1. Because Vfb decreases with decreasing load, the time required for the voltage Vc7 across the capacitor C7 to decrease until it becomes less than Vfb increases with decreasing load. Thus, a circuit including the resistor R8, the capacitor C7, the comparators IC5 and IC6, the offset voltage source Voff, the AND circuit IC7, the RS flip-flop IC11, the drive circuit 13, and the feedback voltage generator defines an off-period control circuit that controls the off-period of the switching device Q1 such that the off-period increases with decreasing load in the light load state. Note that the capacitance of the capacitor C6 and the resistance of the resistor R6 are set such that the capacitor C6 is completely discharged by the above-described point of time. Thereafter, the process after t=0 is repeated.

In the switching power supply 10, as described above with reference to FIGS. 3 and 4, the on-period control circuit controls the on-period of the switching device in the operation under the non-low load condition such that the output voltage is maintained at a constant value, while, in the operation under the low load condition, the minimum on-period setting circuit sets the on-period of the switching device to the minimum on-period, and the off-period control circuit controls the off-period such that the output voltage is maintained at the constant value.

Thus, the increase in the switching frequency in the light load state is suppressed and the switching frequency with decreasing load is greatly reduced, thereby achieving a reduction in switching loss in the light-load state. Furthermore, because the off-period of the switching device is controlled continuously depending on the load in the light-load state, intermittent oscillation is prevented and output ripples are greatly decreased.

As described above, when the on-period control circuit is operating under the non-low load condition, the voltage Vc7 across the capacitor C7 defining the first capacitor increases from a low voltage and crosses the voltage Vfb determined by the feedback signal. On the other hand, when the minimum on-period setting circuit is operating under the low load condition, the voltage Vc7 across the capacitor V7 crosses the voltage Vfb after it decreases from a high voltage. That is, when the on-period control circuit is enabled, the timing of the turning-off of the switching device is determined at the time at which the voltage across the first capacitor crosses the feedback voltage in one direction. On the other hand, when the on-period control circuit is disabled by the minimum on-period setting circuit, the timing of the turning-on of the switching device is determined at the time at which the voltage across the first capacitor crosses the feedback voltage in the opposite direction. As described above, because one capacitor defines both first and third capacitors, a reduction in the number of components is achieved. As a result, the size and cost of the switching power supply are greatly reduced.

By providing the majority of the components of the control circuit as an integrated circuit, the total number of components is greatly reduced, and thus, the size and cost are further reduced.

Figure 5:
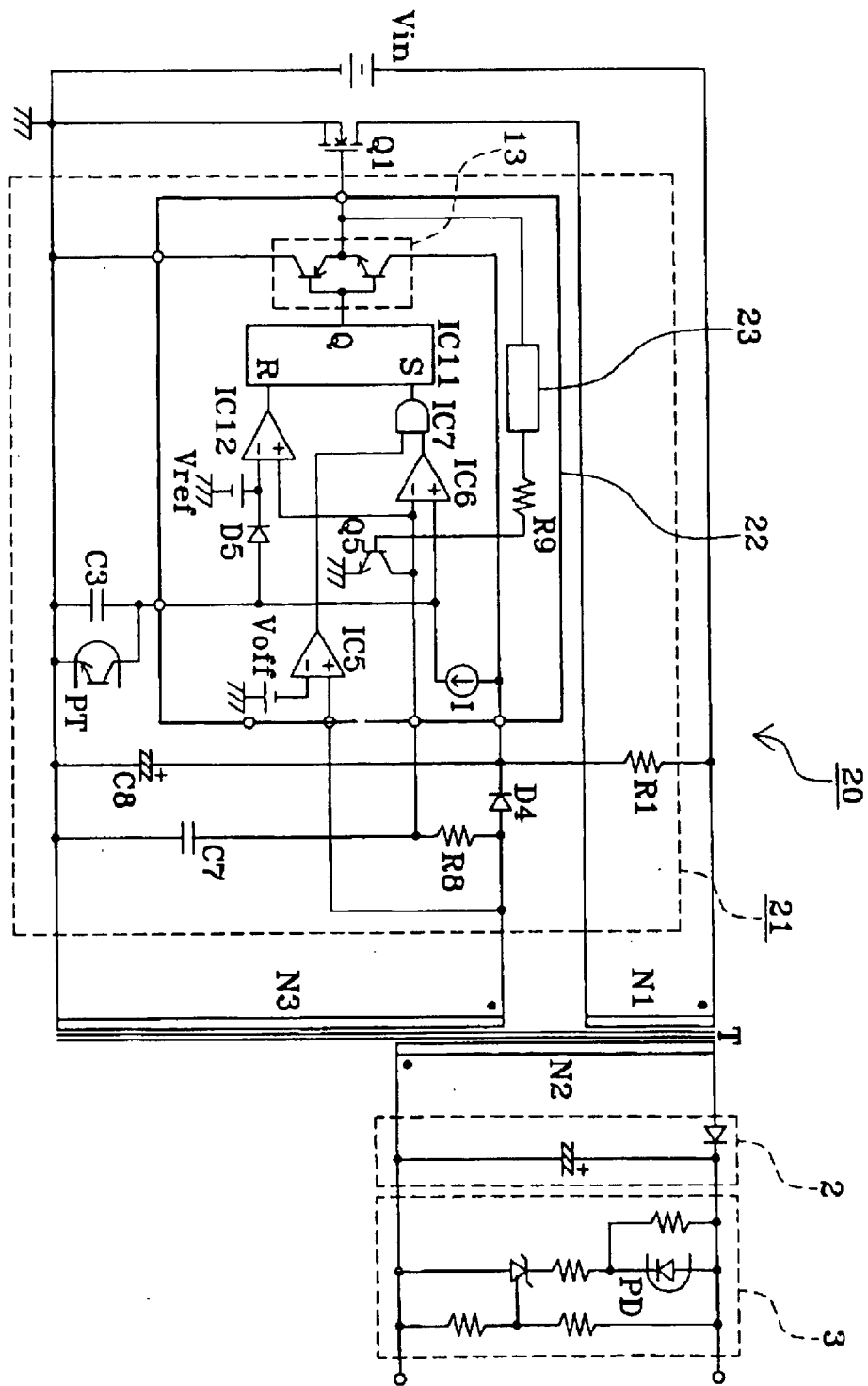
FIG. 5 is a circuit diagram of a switching power supply according to still another preferred embodiment of the present invention.

FIG. 5 is a circuit diagram of a switching power supply according to still another preferred embodiment of the present invention. In FIG. 5, similar components to those in FIG. 3 are denoted by similar reference numerals and the description thereof is omitted.

As shown in FIG. 5, the switching power supply 20 includes a control circuit 21 provided between a feedback winding N3 and the gate of a switching device Q1, wherein a main portion of the control circuit 21 is defined by an integrated circuit 22. The control circuit 21 including constituent elements of the integrated circuit 22 is described below.

One end of the feedback winding N3 is connected to the integrated circuit 22 via a rectifying and smoothing circuit including a diode D4 and a capacitor C8. The voltage output from the rectifying and smoothing circuit is applied to each element of the integrated circuit 22. The node between the diode D4 and the capacitor C8 is connected to a DC power supply Vin via a starting resistor R1.

A phototransistor PT coupled with the light emitting diode PD in the output voltage detecting circuit 3 is arranged such that the collector is connected to a constant current source I the emitter is connected to ground, a capacitor C3 is connected between the collector and emitter, and the collector is connected to an inverting input terminal of a comparator IC6 and also to a non-inverting input terminal of a comparator IC12 via a diode D5. The inverting input terminal of the comparator IC12 is also connected to a reference voltage source Vref. The constant current source I is produced using the voltage supplied to the integrated circuit 22 from the rectifying and smoothing circuit including the diode D4 and the capacitor C8.

The one end of the feedback winding N3 is connected to a non-inverting input terminal of a comparator IC5. An inverting input terminal of the comparator IC5 is connected to an offset voltage source Voff having a small negative voltage such that the output of the comparator IC5 becomes high when the voltage of the non-inverting input terminal is equal to zero.

The one end of the feedback winding N3 is also connected to ground via a resistor R8 and a capacitor C7, and the node between the resistor R8 and the capacitor C7 is connected to the inverting input terminal of the comparator IC6 and also to the non-inverting input terminal of the comparator IC12. The capacitor C7 defines the first, second, and third capacitors.

The outputs of the comparators IC5 and IC6 are connected to two inputs of an AND circuit IC7, and the output of the AND circuit IC7 is connected to a set terminal S of an RS flip-flop IC11. The output of the comparator IC12 is connected to a reset terminal RS of the RS flip-flop IC11. The output terminal Q of the RS flip-flop IC11 is connected to the gate of the switching device Q1 via the drive circuit 13. The drive circuit 13 uses, as a power supply voltage, the voltage supplied to the integrated circuit 12.

The output of the driver circuit 13 is connected to the base of a transistor Q5 via a monostable multivibrator 23 and a resistor R9, and the collector of the transistor Q5 is connected to an inverting input terminal of a comparator IC6, and the emitter of the transistor Q5 is connected to ground.

Of the above elements, the current source I, the comparators, the diode D5, the transistor Q5, the resistor R9, the monostable multivibrator 23, the comparators IC5, IC6, and IC12, the AND circuit IC7, the RS flip-flop IC11, the drive circuit 13, the offset voltage source Voff, and the reference voltage source Vref preferably define the integrated circuit 22.

Figure 6A:
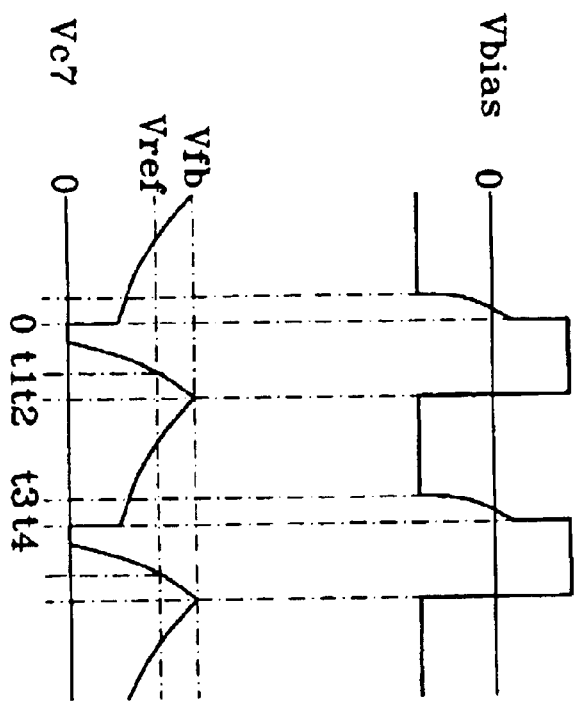
FIG. 6A is a diagram showing temporal changes, under the rated load condition, in Vbias and Vc7 in the switching power supply shown in FIG. 5.
Figure 6B:
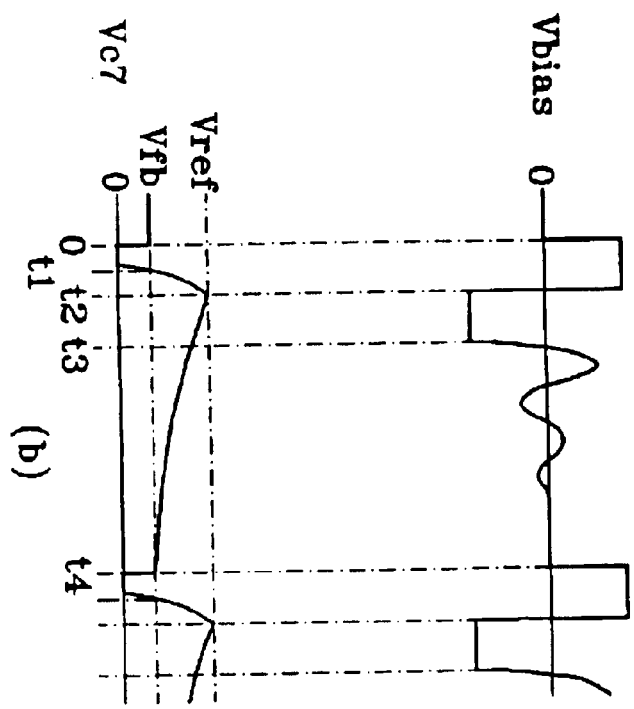
FIG. 6B is a diagram showing similar temporal changes under the low load condition.

The operation of the switching power supply 20 is described below with reference to FIG. 6. FIG. 6 shows temporal changes in the voltage Vbias of the feedback winding N3 and the voltage Vc7 across the capacitor C7 defining the first capacitor, the second capacitor, and the third capacitor in the switching power supply 20, wherein (a) shows changes in the operation under the rated load condition, and (b) shows changes in the operation under the low load condition. In FIG. 6, Vfb denotes the collector voltage of the phototransistor PT, which is applied as a feedback voltage to the non-inverting input terminal of the comparator IC6 and also to the inverting input terminal of the comparator IC12 via the diode D5. Vfb changes with load. However, when the output voltage is maintained at a constant value, for example, in the operation with the rated load, Vfb is maintained at a substantially constant value. Vref denotes the voltage of the reference voltage source Vref, which is connected to the inverting input terminal of the comparator IC12.

The operation under the rated-load condition is described below for various operation stages.

(t=0 to t1)

When the switching device Q1 turns on, a current flows through the primary winding N1, and the voltage Vbias of the feedback winding N3 becomes positive. As a result, charging of the capacitor C7 starts. Under the rated load condition, Vfb is at a high level and the capacitor C7 has been reset just before the turning-on the switching device Q1, as will be described later, the voltage Vc7 across the capacitor C7 is less than Vfb at this point of time and the output of the comparator IC6 is at the H-level. Vfb is further greater than Vref, and thus, Vfb is applied to the inverting input terminal of the comparator IC12 via the diode D5. As a result, the output of the comparator IC12 is at the L-level. Furthermore, the output of the comparator IC5 is at the H-level because the voltage Vbias is applied to the non-inverting input terminal thereof. The output of the AND circuit IC7 is also at the H-level.

(t=t1 to t2)

Even when the voltage Vc7 across the capacitor C7 exceeds Vref, the output of the comparator IC12 remains at the L-level because Vfb that is greater than Vref is applied to the inverting input terminal of the comparator IC12.

(t=t2 to t3)

When the voltage Vc7 across the capacitor C7 exceeds Vfb, the output of the comparator IC12 goes to the H-level. On the other hand, the output level of the comparator IC6 becomes low, and thus, the output level of the AND circuit IC7 becomes low. When the output level of the comparator IC12 becomes high, the rising edge of the output voltage serves as a trigger that resets the RS flip-flop IC11. If the RS flip-flop IC11 is reset, the output thereof goes to the L-level, which causes the switching device Q1 to be turned off via the drive circuit 13, and thus, the on-period terminates. That is, in the change in the voltage Vc7 of the capacitor C7 defining the first capacitor, crossing the voltage Vfb determined by the feedback signal functions as a trigger that determines the timing of the turning-off of the switching device Q1 and thus determines the on-period of the switching device Q1.

Because the resistance between the collector and the emitter of the phototransistor PT decreases as the load reduces and thus, as the intensity of light received from the light emitting diode PD increases, Vfb decreases with decreasing load. Therefore, the time needed for the voltage Vc7 across the capacitor C7 to exceed Vfb decreases with reducing load. Thus, a circuit including the resistor R8, the capacitor C7, the comparator IC12, the diode D5, the RS flip-flop IC11, the drive circuit 13, and the feedback voltage generator define an on-period control circuit that controls the on-period of the switching device Q1 in the operation under the non-low load condition such that the on-period decreases with decreasing load.

When the switching device Q1 turns off, a current starts to flow from the secondary winding N2 into the rectifying and smoothing circuit 2, and the voltage Vbias of the feedback winding N3 becomes negative. As a result, discharging of the capacitor C7 starts. If the discharging of the capacitor C7 begins, the voltage Vc7 across the capacitor C7 immediately becomes less than Vfb, and thus, the output of the comparator IC12 goes to the L-level. On the other hand, the output of the comparator IC6 goes to the H-level, and the output of the comparator IC5 goes to the L-level in response to the application of the negative voltage Vbias to the non-inverting input terminal of the comparator IC5. As a result, the output of the AND circuit IC7 goes to the L-level.

As understood from the above-described description, because the voltage Vc7 across the capacitor C7 quickly returns to a level less than Vfb after becoming higher than Vfb, the turning-off of the switching device Q1 occurs when the voltage Vc7 reaches Vfb without exceeding it.

(t=t3 to t4)

When the switching device Q1 is in the off-state, if the current flowing out of the secondary winding N2 into the rectifying and smoothing circuit 2 becomes zero, the voltage Vbias of the feedback winding N3 starts to resonate.

(t≧t4)

The first positive portion of a resonating wave of the voltage Vbias causes the voltage of the non-inverting input terminal of the comparator IC5 to become greater than the voltage of the inverting input terminal, and thus, the output level of the comparator IC5 becomes high. Because the output level of the comparator IC6 is already high, the output of the AND circuit IC7 goes to the H-level. The rising edge of this transition of the output voltage serves as a trigger that sets the RS flip-flop IC11. If the RS flip-flop IC11 is set, the output thereof goes to the H-level, which causes the switching device Q1 to be turned on via the drive circuit 13. That is, the transition-to-zero of the current from the secondary winding N2 to the rectifying and smoothing circuit 2 serves as a trigger that turns on the switching device Q1. If the switching device Q1 turns on, the resonance of the voltage Vbias stops, and the voltage Vbias again becomes positive.

The signal that is output from the drive circuit 13 to turn on the switching device Q1 serves as a trigger signal to the monostable multivibrator 23. This causes the output level of the monostable multivibrator 23 to temporarily become high. This output is applied to the base of the transistor Q5 via the resistor R9, and thus, the transistor Q5 temporarily turns on. The transition of the transistor Q5 into the on-state causes the charge stored in the capacitor C7 to be instantly released, and thus, the voltage Vc7 across the capacitor C7 is reset to 0 V. Thereafter, the process after t=0 is repeated.

Under the rated load condition (under non-low load condition), as described above, when the current flowing through the primary winding N1 stops, a current immediately starts to flow from the secondary winding N2 to the rectifying and smoothing circuit 2, and, if the current flowing out of the secondary winding N2 stops, the switching device Q1 immediately turns on and a current starts to flow through the primary winding N1. Thus, under the rated load condition, the switching power supply 20 operates in the current-critical mode.

The operation under the low load condition is described below for various operation stages.

(t=0 to t1)

When the switching device Q1 turns on, a current flows through the primary winding N1, and the voltage Vbias of the feedback winding N3 becomes positive. As a result, charging of the capacitor C7 begins. As a result of the change of the voltage Vbias to a positive value, the output level of the comparator IC5 becomes high. In the operation under the low load condition, Vfb becomes less than Vref, and thus, Vref is applied to the inverting input terminal of the comparator IC12. Because the capacitor C7 is reset just before this point of time, as will be described later, the voltage Vc7 across the capacitor C7 is substantially equal to 0 V and thus lower than Vref. As a result, the output level of the comparator IC6 becomes high, and the output level of the comparator IC12 becomes low.

(t=t1 to t2)

If the voltage Vc7 across the capacitor C7 increases until it becomes greater than Vfb, the output level of the comparator IC6 becomes low. However, the voltage Vref applied to the inverting input terminal of the comparator IC12 is still greater than the voltage Vc7, the output of the comparator IC12 remains at the L-level. This means that the crossing of Vfb in the increase in the voltage Vc7 across the capacitor C7 defining the first capacitor does not function as a trigger that causes the switching device Q1 to turn off. That is, the on-period control circuit is disabled.

(t=t2 to t3)

When the voltage Vc7 across the capacitor C7 exceeds Vref, the output level of the comparator IC12 becomes high, and the rising edge of this transition of the output voltage serves as a trigger that resets the RS flip-flop IC11. If the RS flip-flop IC11 is reset, the output thereof goes to the L-level, which causes the switching device Q1 to be turned off via the drive circuit 13. Thus, in the increase in the voltage Vc7 of the capacitor C7 also defining the second capacitor, crossing the voltage Vref functions as a trigger that determines the timing of the turning-off of the switching device Q1 and thus, determines the on-period. In other words, the minimum on-period of the switching device Q1 is determined by a period needed for the voltage Vc7 across the capacitor C7 to increase until it exceeds Vref. Thus, a circuit including the resistor R8, the capacitor C7, the comparator IC12, and the reference voltage source Vref defines a minimum on-period setting circuit that disables the on-period control circuit from turning on the switching device in the operation under the low load condition. The reason why the minimum on-period is given by the period needed for the voltage Vc7 across the capacitor C7 to exceed Vref will be described later. The reason why the minimum on-period setting circuit includes, in addition to the above-described elements, the monostable multivibrator 23, the resistor R9, and the transistor Q5 will also be described later.

When the switching device Q1 turns off, a current starts to flow from the secondary winding N2 into the rectifying and smoothing circuit 2, and the voltage Vbias of the feedback winding N3 becomes negative. As a result, discharging of the capacitor C7 begins. If the discharging of the capacitor C7 starts, the voltage Vc7 across the capacitor C7 immediately becomes less than Vfb, and thus, the output level of the comparator IC12 becomes low.

(t=t3 to t4)

When the switching device Q1 is in the off-state, if the current flowing out of the secondary winding N2 into the rectifying and smoothing circuit 2 becomes zero, the voltage Vbias of the feedback winding N3 starts to resonate. The first positive portion of the resonating wave of the voltage Vbias causes the voltage of the non-inverting input terminal of the comparator IC5 to become greater than the voltage of the inverting input terminal, and thus, the output level of the comparator IC5 becomes high. However, at this point in time, the voltage Vc7 across the capacitor C7 is still greater than Vfb and the output of the comparator IC6 still remains at the L-level. Therefore, the output of the AND circuit IC7 remains at the L-level, and thus, the RS flip-flop IC11 is not set. That is, the turning-on of the switching device Q1 by the resonating voltage Vbias is prevented. Therefore, after that, no current flows through the primary winding N1 and the secondary winding N2. As a result, the current-critical mode is aborted. Thus, the resonating voltage Vbias attenuates with passage of time, and the output level of the comparator IC5 becomes alternately high and low. When the voltage Vbias has completely attenuated, the voltage of the non-inverting input terminal of the comparator IC5 becomes equal to zero. In this state, because the inverting input terminal of the comparator IC5 is connected to the offset voltage source Voff having a small negative value, the output level of the comparator IC5 becomes high. On the other hand, the capacitor C7 is further discharged, and the voltage Vc7 across the capacitor C7 further decreases.

(t≧t4)

If the voltage Vc7 across the capacitor C7 decreases until it becomes less than Vfb, the output of the comparator IC6 goes to the H-level. Because the output level of the comparator IC5 is already high, the output of the AND circuit IC7 goes to the H-level. The rising edge of this transition of the output voltage serves as a trigger that sets the RS flip-flop IC11. If the RS flip-flop IC11 is set, the output thereof goes to the H-level, which causes the switching device Q1 to be turned on via the drive circuit 13. Thus, the crossing of the voltage Vc7 of the capacitor C7 also defining the third capacitor across Vfb serves as a trigger that determines the timing of the turning-on of the switching device Q1. Because Vfb decreases with decreasing load, the time needed for the voltage Vc7 across the capacitor C7 to decrease until it becomes less than Vfb increases with decreasing load. Thus, a circuit including the resistor R8, the capacitor C7, the comparators IC5 and IC6, the offset voltage source Voff, the AND circuit IC7, the RS flip-flop IC11, the drive circuit 13, and the feedback voltage generator defines an off-period control circuit that controls the off-period of the switching device Q1 such that the off-period increases with decreasing load in the light load state.

The signal that is output from the drive circuit 13 to turn on the switching device Q1 is also applied as a trigger signal to the monostable multivibrator 23. This causes the output level of the monostable multivibrator 23 to temporarily become high. This output is applied to the base of the transistor Q5 via the resistor R9, and thus, the transistor Q5 temporarily turns on. The transition of the transistor Q5 into the on-state causes the charge stored in the capacitor C7 to be released in an instant, and thus, the voltage Vc7 across the capacitor C7 is reset to 0 V. Thereafter, the process after t=0 is repeated.

Now, the reason why the minimum on-period is given by the period needed for the voltage Vc7 across the capacitor C7 to exceed Vref, and the reason why the minimum on-period setting circuit includes the monostable multivibrator 23, the resistor R9, and the transistor Q5 are described. If the monostable multivibrator 23 is not included, the charging of the capacitor C7 after the switching device Q1 turns on starts from a state in which the capacitor C7 has been charged until the voltage Vc7 across the capacitor C7 becomes equal to Vfb. Vfb changes depending on the load, although Vref is constant. Therefore, the period needed for the voltage Vc7 across the capacitor C7 to be charged to Vref changes depending on the load. This period corresponds to the on-period in the operation under the low load condition. Therefore, if the monostable multivibrator 23 is not included, the on-period varies in the operation under the low load condition, the minimum on-period cannot be set. In contrast, if the capacitor C7 is reset by the monostable multivibrator 23 when the switching device Q1 turns on, the capacitor C7 is always charged starting from 0 V until the voltage becomes equal to Vref, and thus, the charging time becomes constant. This makes it possible to set the minimum on-period regardless of the magnitude of the load. For the above-described reason, the minimum on-period setting circuit includes the monostable multivibrator 23, the resistor R9, and the transistor Q5.

In the switching power supply 20, as described above with reference to FIGS. 5 and 6, the on-period control circuit controls the on-period of the switching device in the operation under the non-low load condition such that the output voltage is maintained at a constant value, while, in the operation under the low load condition, the minimum on-period setting circuit sets the on-period of the switching device to the minimum on-period, and the off-period control circuit controls the off-period such that the output voltage is maintained at the constant value.

Thus, the increase in the switching frequency in the operation under the low load condition is suppressed and the switching frequency with decreasing load is decreased, thereby greatly reducing switching loss in the light-load state. Furthermore, because the off-period of the switching device is controlled continuously depending on the load in the light-load state, intermittent oscillation is prevented and output ripples are greatly reduced.

As described above, when the on-period control circuit is operating under the non-low load condition, the voltage Vc7 across the capacitor C7 defining the first capacitor increases from a low voltage and crosses the voltage Vfb determined by the feedback signal. On the other hand, when the minimum on-period setting circuit is operating under the low load condition, the voltage Vc7 across the capacitor V7 crosses the voltage Vfb after it decreases from a high voltage. That is, when the on-period control circuit is operating, the timing of the turning-off of the switching device is determined at the time at which the voltage across the first capacitor crosses the feedback voltage in one direction. On the other hand, when the on-period control circuit is disabled by the minimum on-period setting circuit, the timing of the turning-on of the switching device is determined at the time at which the voltage across the first capacitor crosses the feedback voltage in the opposite direction. As described above, because one capacitor defines both first and third capacitors, the number of components is reduced. As a result, the size and cost of the switching power supply are greatly reduced.

Furthermore, because the functions of the first capacitor, the second capacitor, and the third capacitor are all performed by one capacitor C7, the number of externally provided components is further reduced. Thus, the size and cost of the switching power supply is further reduced.

In each preferred embodiment described above, the minimum on-period setting circuit disables the on-period control circuit from turning on the switching device in the operation under the low load condition. In this sense, the minimum on-period setting circuit is included in the on-period control circuit and which, in the operation under the low load condition, disables the on-period control circuit from turning off the switching device for a fixed period after the switching device turns on.

Furthermore, in each preferred embodiment described above, the turning-on or turning-off of the switching device is triggered when the first, second, and the third capacitors are charged or discharged until the voltages across them cross the reference voltage or the feedback voltage. However, the manners of triggering are not limited to those described above with reference to the preferred embodiments. For example, the feedback voltage may be set such that it increases with reducing load, and the manner in which the capacitor voltage exceeds the feedback voltage may be modified such that exceeding occurs in the discharging process instead of the charging process or such that exceeding occurs in the charging process instead of the discharging process.

Furthermore, in each preferred embodiment described above, the turning-on or turning-off of the switching device is triggered when the voltage across the first, second, or third capacitor crosses the reference voltage or the feedback voltage. However, in a practical sense, the turning-on or turning-off of the switching device is triggered when the capacitor voltage reaches the reference voltage or the feedback voltage. That is, the voltage across the first, second, or third capacitor need not cross the reference voltage or the feedback voltage. Therefore, the comparator may be replaced with a circuit that outputs a trigger signal when two inputs become equal to each other such that the turning-on or turning-off of the switching device is triggered when the voltage across the firsts second, or third capacitor reaches the reference voltage or the feedback voltage.

Figure 7:
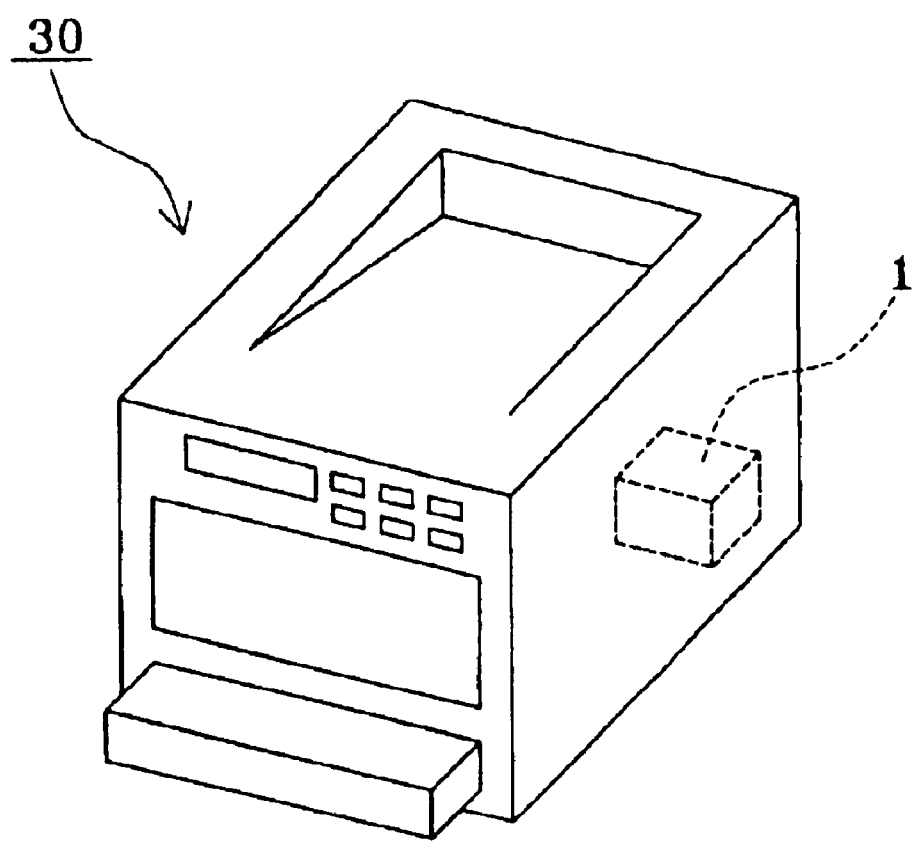
FIG. 7 is a perspective view of an electronic apparatus according to another preferred embodiment of the present invention.

FIG. 7 is a perspective view of an electronic apparatus according to another preferred embodiment of the present invention. In the example shown in FIG. 7, a printer 30 is described as the electronic apparatus wherein the switching power supply 1 according to other preferred embodiments of the present invention is provided in a power supply circuit of the printer 30.

In the operation of the printer 30, electric power is consumed when printing is performed. However, in a standby state in which a printing operation is not performed, the load becomes low and substantially no electric power is consumed. Thus, use of the switching power supply 1 according to preferred embodiments of the present invention reduces the power loss in the standby state in which the load is low, and thus, greatly improves the efficiency of the printer.

In the printer 30 shown in FIG. 7, the switching power supply 1 shown in FIG. 1 is provided. Alternatively, the switching power supply 10 or 20 shown in FIG. 3 or 5 may be provided to achieve similar functions and advantages.

The electronic apparatus according to the preferred embodiment of the present invention is not limited to the printer. The present invention may be applied to various types of electric apparatuses, such as a notebook personal computer and a portable information device, which need a DC power supply capable of outputting a stabilized voltage.

In the switching power supply according to the preferred embodiments of the present invention, the output voltage is controlled at a constant value in accordance with the feedback signal by, in the operation under the non-low load condition, controlling the on-period within the range greater than the predetermined minimum on-period, while, in the operation under the low load condition, fixing the on-period to the minimum on-period and controlling the off-period, thereby achieving a reduction in the switching loss in the operation under the low load condition. In this switching power supply according to preferred embodiments of the present invention, no intermittent oscillation occurs during the operation under the low load condition, and thus, the ripple caused by the intermittent oscillation is prevented.

In the electronic apparatus according to the preferred embodiment of the present invention including the switching power supply according to preferred embodiments of the present invention greatly improved efficiency in the standby state is achieved.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A switching power supply comprising:
   a transformer including a primary winding, a secondary winding and a feedback winding;
   a switching device connected in series to the primary winding and having a control terminal;
   a control circuit connected between the feedback winding and the control terminal of the switching device;
   a rectifying and smoothing circuit connected to the secondary winding, for rectifying and smoothing a voltage generated in the secondary winding and outputting a resultant rectified and smoothed voltage; and
   an output voltage detecting circuit for detecting the voltage output from the rectifying and smoothing circuit and outputting a feedback signal to the control circuit; wherein
   in an operation under a non-low load condition, the control circuit controls the output voltage at a constant value in accordance with the feedback signal from the output voltage detecting circuit by controlling the on-period such that the on-period decreases with decreasing load within a range greater than a predetermined minimum on-period, and in an operation under a low load condition, the control circuit controls the output voltage at a constant value in accordance with the feedback signal from the output voltage detecting circuit by fixing the on-period to the minimum on-period and controlling the off-period such that the off-period increases with decreasing load.

2. A switching power supply according to claim 1, wherein the control circuit includes:
   an on-period control circuit that controls an on-period of the switching device during an operation under a non-low load condition such that the on-period decreases with decreasing load;
   a minimum on-period setting circuit that disables the on-period control circuit from turning on the switching device during an operation under a low load condition so that the on-period of the switching device does not become shorter than a predetermined minimum on-period; and
   an off-period control circuit that controls an off-period of the switching device during the operation under the low load condition such that, when the operation of the on-period control circuit is disabled by the minimum on-period setting circuit, the off-period increases with decreasing load; whereby the output voltage is controlled at a constant value in accordance with the feedback signal.

3. A switching power supply according to claim 1, wherein during the operation under the non-low load condition, the switching power supply operates in a current-critical mode.

4. A switching power supply according to claim 2, wherein the on-period control circuit includes a first capacitor that is charged or discharged during the on-period of the switching device, and the timing of turning-off of the switching device is determined by a time at which the voltage across the first capacitor reaches a voltage determined by the feedback signal;
   the minimum on-period setting circuit includes a second capacitor that is charged or discharged during the on-period of the switching device, the turning-off of the switching device by the on-period control circuit is disabled until the voltage across the second capacitor reaches a reference voltage; and
   the off-period control circuit includes a third capacitor that is charged or discharged during the off-period of the switching device, and the timing of turning-on of the switching device is determined by a time at which the voltage across the third capacitor reaches a voltage determined by the feedback signal.

5. A switching power supply according to claim 4, wherein the first capacitor and the third capacitor are integrated.

6. A switching power supply according to claim 4, wherein the first capacitor, the second, and third capacitors are integrated.

7. A switching power supply according to claim 5, wherein when the on-period control circuit is operating, the timing of turning-off of the switching device is determined at a time at which the voltage across the first capacitor crosses, in first direction, the voltage determined by the feedback signal; and when the operation of the on-period control circuit is disabled by the minimum on-period setting circuit, the timing of turning-on of the switching device is determined at a time at which the voltage across the first capacitor crosses, in a second direction that is opposite to the first direction, the voltage determined by the feedback signal.

8. A switching power supply according to claim 4, wherein the minimum on-period setting circuit is a device, included in the on-period control circuit, for, during the operation under low load condition, preventing the on-period control circuit from turning off the switching device for a fixed period after the switching device turns on.

9. A switching power supply according to claim 8, wherein the minimum on-period setting Circuit discharges the first capacitor when the switching device turns on, and the minimum on-period setting circuit prevents the switching device from turning off thereafter until the voltage of the first capacitor is charged thereafter until it reaches a predetermined voltage.

10. An electronic apparatus comprising a switching power supply including:

a transformer including a primary winding, a secondary winding and a feedback winding;

a switching device connected in series to the primary winding and having a control terminal;

a control circuit connected between the feedback winding and the control terminal of the switching device;

a rectifying and smoothing circuit connected to the secondary winding, for rectifying and smoothing a voltage generated in the secondary winding and outputting a resultant rectified and smoothed voltage; and an output voltage detecting circuit for detecting the voltage output from the rectifying and smoothing circuit and outputting a feedback signal to the control circuit; wherein in an operation under a non-low load condition, the control circuit controls the output voltage at a constant value in accordance with the feedback signal from the output voltage detecting circuit by controlling the on-period such that the on-period decreases with decreasing load within a range greater than a predetermined minimum on-period, and in an operation under a low load condition, the control circuit controls the output voltage at a constant value in accordance with the feedback signal from the output voltage detecting circuit by fixing the on-period to the minimum on-period and controlling the off-period such that the off-period increases with decreasing load.

11. A switching power supply comprising:

a transformer having a primary winding, a secondary winding and a feedback winding;

a switching device connected in series to the primary winding and having a control terminal;

a control circuit connected between the feedback winding and the control terminal of the switching device;

a rectifying and smoothing circuit connected to the secondary winding, for rectifying and smoothing a voltage generated in the secondary winding and outputting a resultant rectified and smoothed voltage; and an output voltage detecting circuit for detecting the voltage output from the rectifying and smoothing circuit and outputting a feedback signal to the control circuit; wherein the control circuit includes:

an on-period control circuit that controls an on-period of the switching device during an operation under a non-low load condition such that the on-period decreases with decreasing load;

a minimum on-period setting circuit that disables the on-period control circuit from turning on the switching device during an operation under a low load condition so that the on-period of the switching device does not become shorter than a predetermined minimum on-period; and an off-period control circuit that controls an off-period of the switching device during the operation under the low load condition such that, when the operation of the on-period control circuit is disabled by the minimum on-period setting circuit, the off-period increases with decreasing load; whereby the output voltage is controlled at a constant value in accordance with the feedback signal from the output voltage detecting circuit.

12. A switching power supply according to claim 11, wherein during the operation under the non-low road condition, the switching power supply operates in a current-critical mode.

13. A switching power supply according to claim 11, wherein the on-period control circuit includes a first capacitor that is charged or discharged during the on-period of the switching device, and the timing of turning-off of the switching device is determined by a time at which the voltage across the first capacitor reaches a voltage determined by the feedback signal;

the minimum on-period setting circuit includes a second capacitor that is charged or discharged during the on-period of the switching device, the turning-off of the switching device by the on-period control circuit is disabled until the voltage across the second capacitor reaches a reference voltage; and the off-period control circuit includes a third capacitor that is charged or discharged during the off-period of the switching device, and the timing of turning-on of the switching device is determined by a time at which the voltage across the third capacitor reaches a voltage determined by the feedback signal.

14. A switching power supply according to claim 13, wherein the first capacitor and the third capacitor are integrated.

15. A switching power supply according to claim 13, wherein the first capacitor, the second, and third capacitors are integrated.

16. A switching power Supply according to claim 14, wherein when the on-period control circuit is operating, the timing of turning-off of the switching device is determined at a time at which the voltage across the first capacitor crosses, in a first direction, the voltage determined by the feedback signal; and when the operation of the on-period control circuit is disabled by the minimum on-period setting circuit, the timing of turning-on of the switching device is determined at a time at which the voltage across the first capacitor crosses, in a second direction that is opposite to the first direction, the voltage determined by the feedback signal.

17. A switching power supply according to claim 13, wherein the minimum on-period setting circuit is a device, included in the on-period control circuit, for,during the operation under low load condition, preventing the on-period control circuit from turning off the switching device for a fixed period after the switching device turns on.

18. A switching power supply according to claim 17, wherein the minimum on-period setting circuit discharges the first capacitor when the switching device turns on, and the minimum on-period setting circuit prevents the switching device from turning off thereafter until the voltage of the first capacitor is charged thereafter until it reaches a predetermined voltage.

19. An electronic apparatus comprising a switching power supply including:
   a transformer having a primary winding, a secondary winding and a feedback winding;
   a switching device connected in series to the primary winding and having a control terminal;
   a control circuit connected between the feedback winding and the control terminal of the switching device;
   a rectifying and smoothing circuit connected to the secondary winding, for rectifying and smoothing a voltage generated in the secondary winding and outputting a resultant rectified and smoothed voltage; and
   an output voltage detecting circuit for detecting the voltage output from the rectifying and smoothing circuit and outputting a feedback signal to the control circuit; wherein
   the control circuit includes:
      an on-period control circuit that controls an on-period of the switching device during an operation under a non-low load condition such that the on-period decreases with decreasing load;
      a minimum on-period setting circuit that disables the on-period control circuit from turning on the switching device during an operation under a low load condition so that the on-period of the switching device does not become shorter than a predetermined minimum on-period; and
      an off-period control circuit that controls an off-period of the switching device during the operation under the low load condition such that, when the operation of the on-period control circuit is disabled by the minimum on-period setting circuit, the off-period increases with decreasing load; whereby the output voltage is controlled at a constant value in accordance with the feedback signal from the output voltage detecting circuit.

* * * * *